US008140368B2

(12) United States Patent
Eggenberger et al.

(10) Patent No.: US 8,140,368 B2
(45) Date of Patent: Mar. 20, 2012

(54) METHOD AND SYSTEM FOR ROUTING A TASK TO AN EMPLOYEE BASED ON PHYSICAL AND EMOTIONAL STATE

(75) Inventors: Christian Eggenberger, Wil (CH); Peter Malkin, Ardsley, NY (US); Paul Sorenson, Sheboygan, WI (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/098,911

(22) Filed: Apr. 7, 2008

(65) Prior Publication Data
US 2009/0254404 A1 Oct. 8, 2009

(51) Int. Cl.
*G06F 10/00* (2006.01)

(52) U.S. Cl. ..................... 705/7.14; 705/7.42

(58) Field of Classification Search .............. 705/9, 11, 705/7, 7.11, 7.12, 7.13, 7.14, 7.15, 7.38, 705/7.42
See application file for complete search history.

(56) References Cited

U.S. PATENT DOCUMENTS

| | | | |
|---|---|---|---|
| 5,477,166 A | 12/1995 | Matthews | |
| 5,974,392 A * | 10/1999 | Endo | 705/8 |
| 6,358,201 B1 * | 3/2002 | Childre et al. | 600/300 |
| 6,405,159 B2 * | 6/2002 | Bushey et al. | 705/10 |
| 6,411,687 B1 | 6/2002 | Bohacek et al. | |
| 6,480,826 B2 | 11/2002 | Pertrushin | |
| 6,544,172 B2 * | 4/2003 | Toeppen-Sprigg | 600/300 |
| 6,675,130 B2 * | 1/2004 | Kanevsky et al. | 702/188 |
| 6,721,704 B1 | 4/2004 | Strubbe et al. | |
| 6,742,002 B2 * | 5/2004 | Arrowood | 705/11 |
| 6,853,966 B2 * | 2/2005 | Bushey et al. | 706/46 |
| 6,904,143 B1 * | 6/2005 | Peterson et al. | 379/265.01 |
| 7,004,389 B1 * | 2/2006 | Robinson et al. | 235/382 |
| 7,085,719 B1 | 8/2006 | Shambaugh et al. | |
| 7,092,920 B2 * | 8/2006 | Heard | 706/12 |
| 7,165,033 B1 | 1/2007 | Liberman | |
| 7,263,183 B1 * | 8/2007 | Klein et al. | 379/265.09 |
| 7,457,404 B1 * | 11/2008 | Hession et al. | 379/265.07 |
| 2003/0115088 A1 * | 6/2003 | Thompson | 705/7 |
| 2004/0147814 A1 * | 7/2004 | Zancho et al. | 600/300 |
| 2004/0193473 A1 * | 9/2004 | Robertson et al. | 705/9 |
| 2005/0209902 A1 * | 9/2005 | Iwasaki et al. | 705/8 |
| 2005/0286705 A1 * | 12/2005 | Contolini et al. | 379/265.02 |
| 2006/0098803 A1 * | 5/2006 | Bushey et al. | 379/265.01 |
| 2006/0115070 A1 * | 6/2006 | Bushey et al. | 379/265.02 |
| 2006/0271418 A1 * | 11/2006 | Hackbarth, et al. | 705/7 |

(Continued)

OTHER PUBLICATIONS

McCraty, R., "Science of the Heart, Exploring the Role of the Heart in Human Performance" HearthMath Research Center, Institute of HeartMath, Publication No. 01-001 (2001) http://www.heartmath.org/research/science-of-the-heart/.

(Continued)

*Primary Examiner* — Beth V Boswell
*Assistant Examiner* — Ivan R Goldberg
(74) *Attorney, Agent, or Firm* — Scully, Scott, Murphy & Presser, P.C.; Daniel P. Morris, Esq.

(57) ABSTRACT

A method, system, computer program product, and computer program storage device for determining an assignment of a task to a consultant is disclosed. The method, system, computer program product, and computer program storage device determine the assignment based not only on availability and skill set, but also based on an estimated impact on the emotional state and the physical state of consultants.

18 Claims, 7 Drawing Sheets

Consultant Compatibility Handler Flow

U.S. PATENT DOCUMENTS

2006/0282306 A1* 12/2006 Thissen-Roe ............. 705/11
2007/0143167 A1* 6/2007 Cohen ..................... 705/9
2008/0201167 A1* 8/2008 Eggenberger-Wang et al. . 705/2

OTHER PUBLICATIONS

"Heart Rate Variability", The John D. and Katherine T. MacArthur Foundation, Research Network on Socioeconomic Status and Health (1997) http://www.macses.ucstedu/Research/Allostatic/heartrate.php.

Chen, Daniel ?t al . "Using Mental Load for Managing Interruptions in Physiologically Attentive User Inierfaces" Queen's University, 2004.

McCarty, Rollin et al., "The Coherent Heart: Heart-Brain Interactions, Psychophysiological Coherence and the Emergence of System0-Wide Order", Heartrylath Research Center, Institute of Heartnriath, 2006.

Prinzel, Lawrence et al., "Empirical Analysis of EEG and ERPs for Psychoohysiological Adoptive Task Allocaton", NASA, Jun. 2001.

* cited by examiner

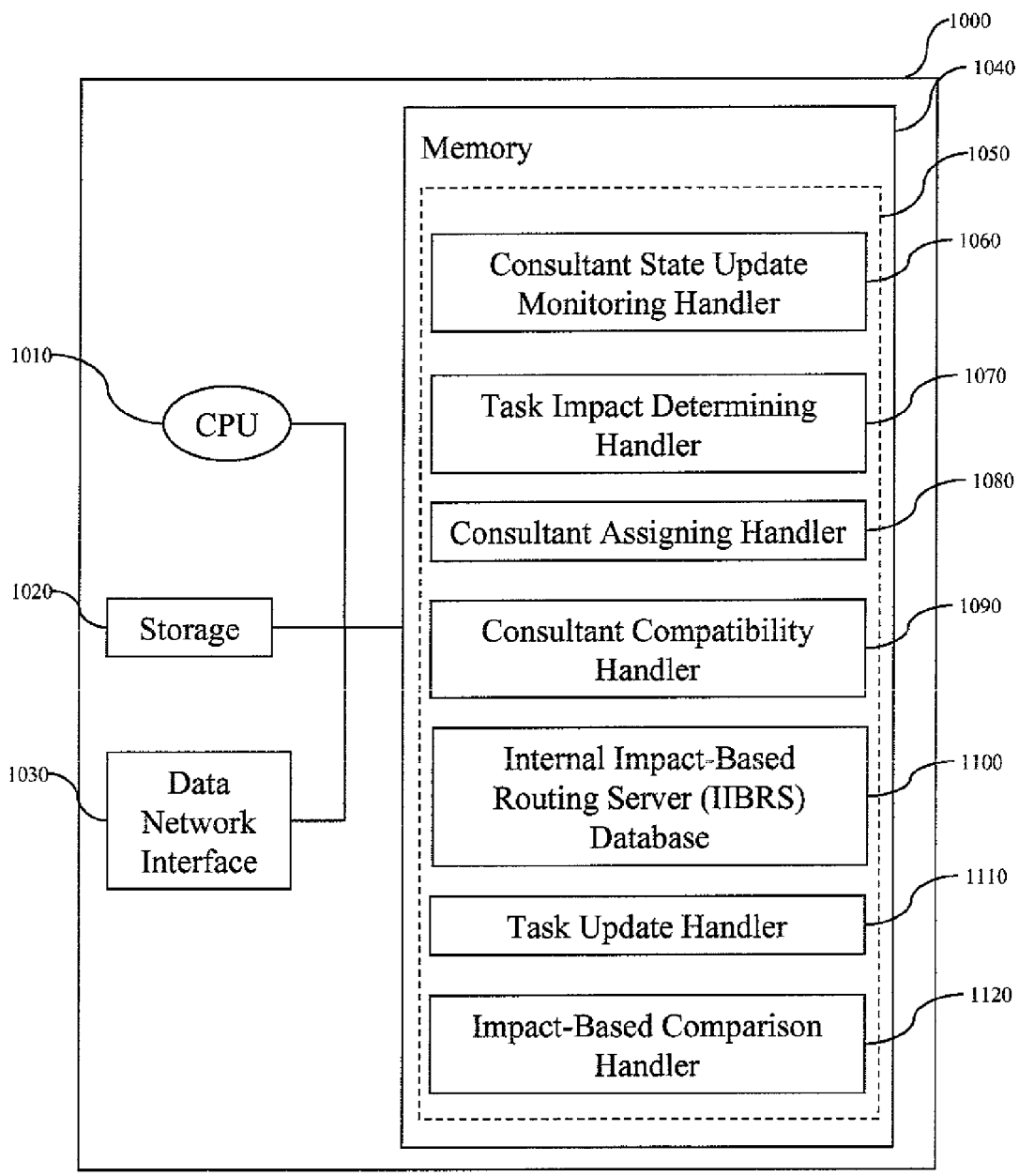
Fig. 1: Internal Impact-Based Task Routing Server (IIBRS) Component Diagram

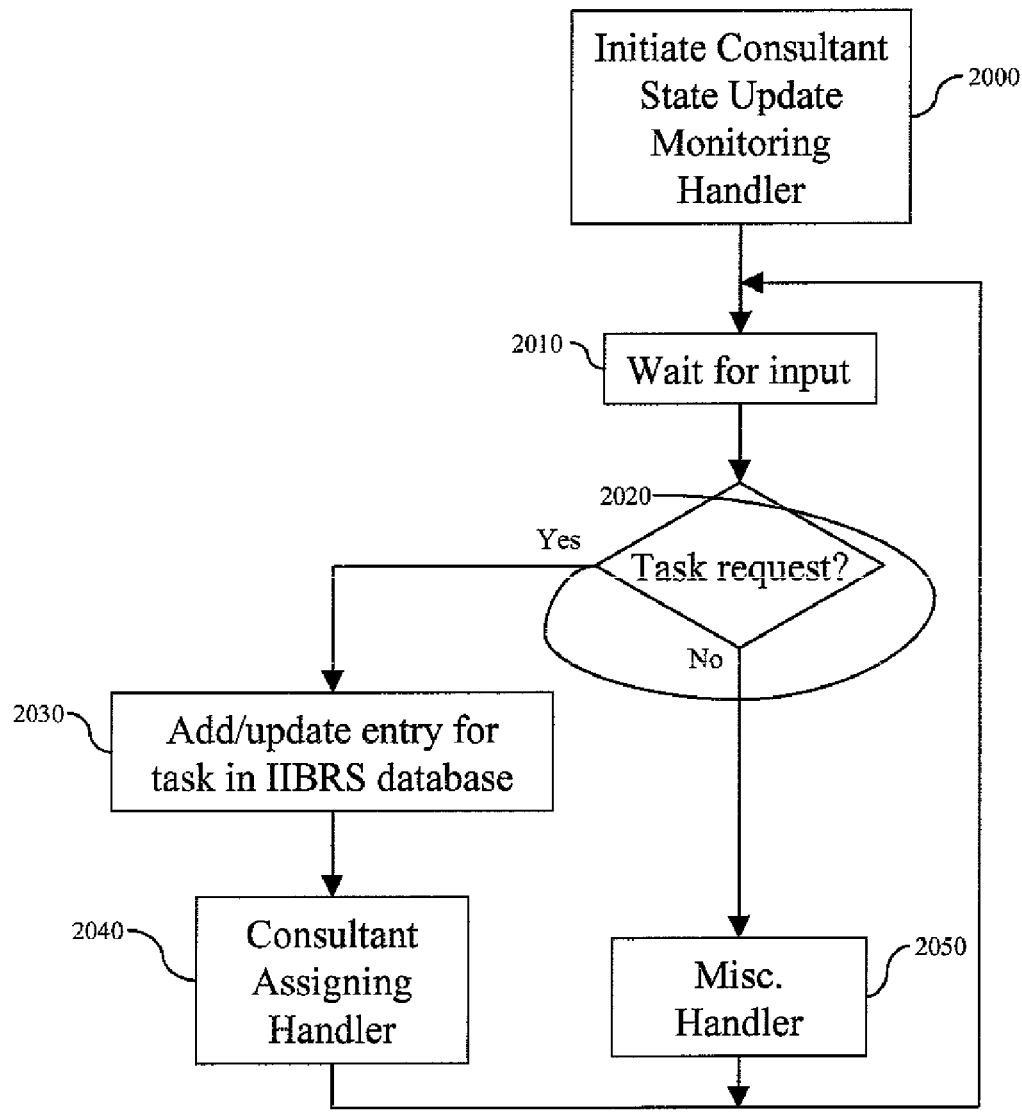
Fig. 2: Internal Impact-Based Routing Server Logic

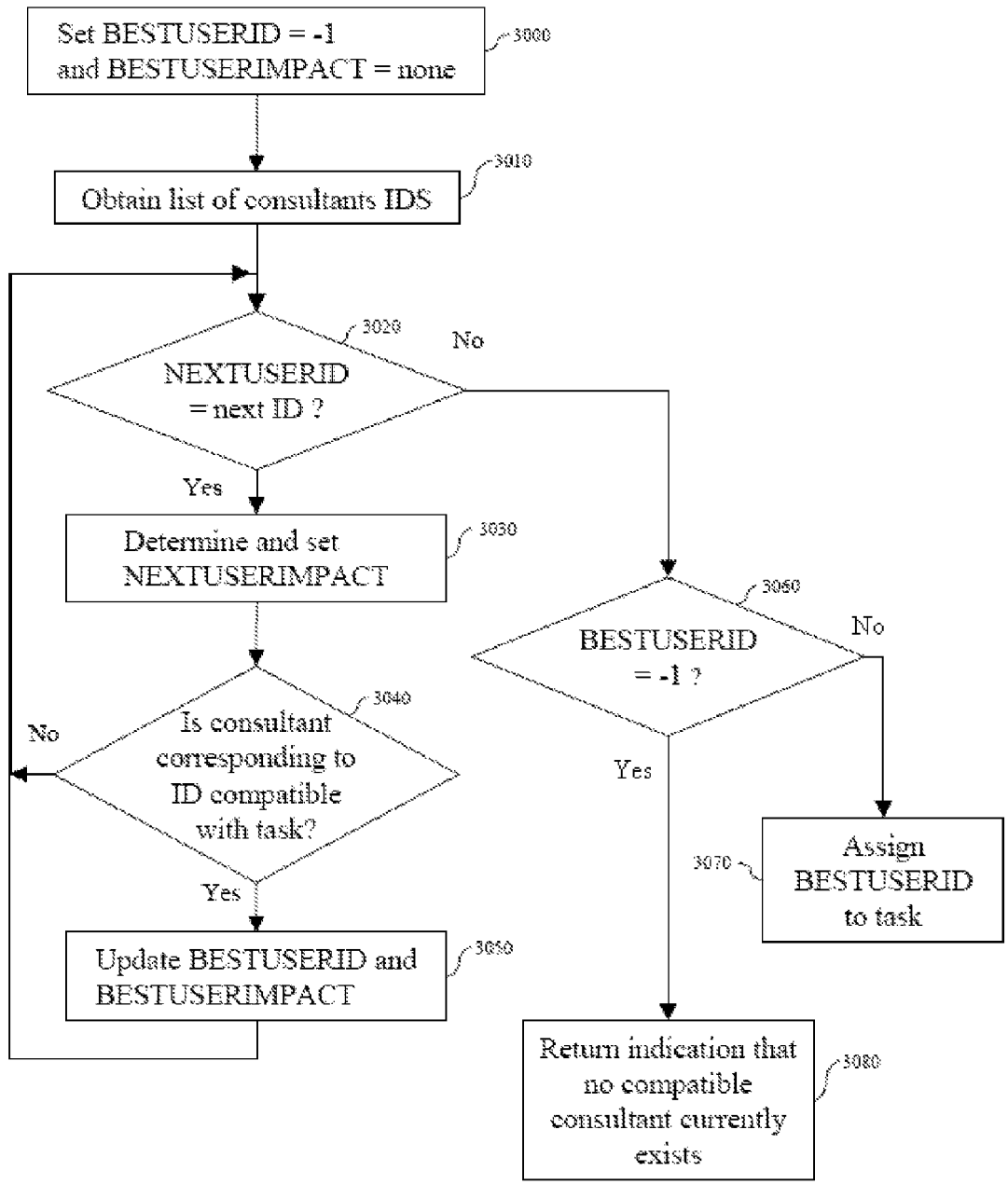
Fig. 3: Consultant Assigning Handler Logic

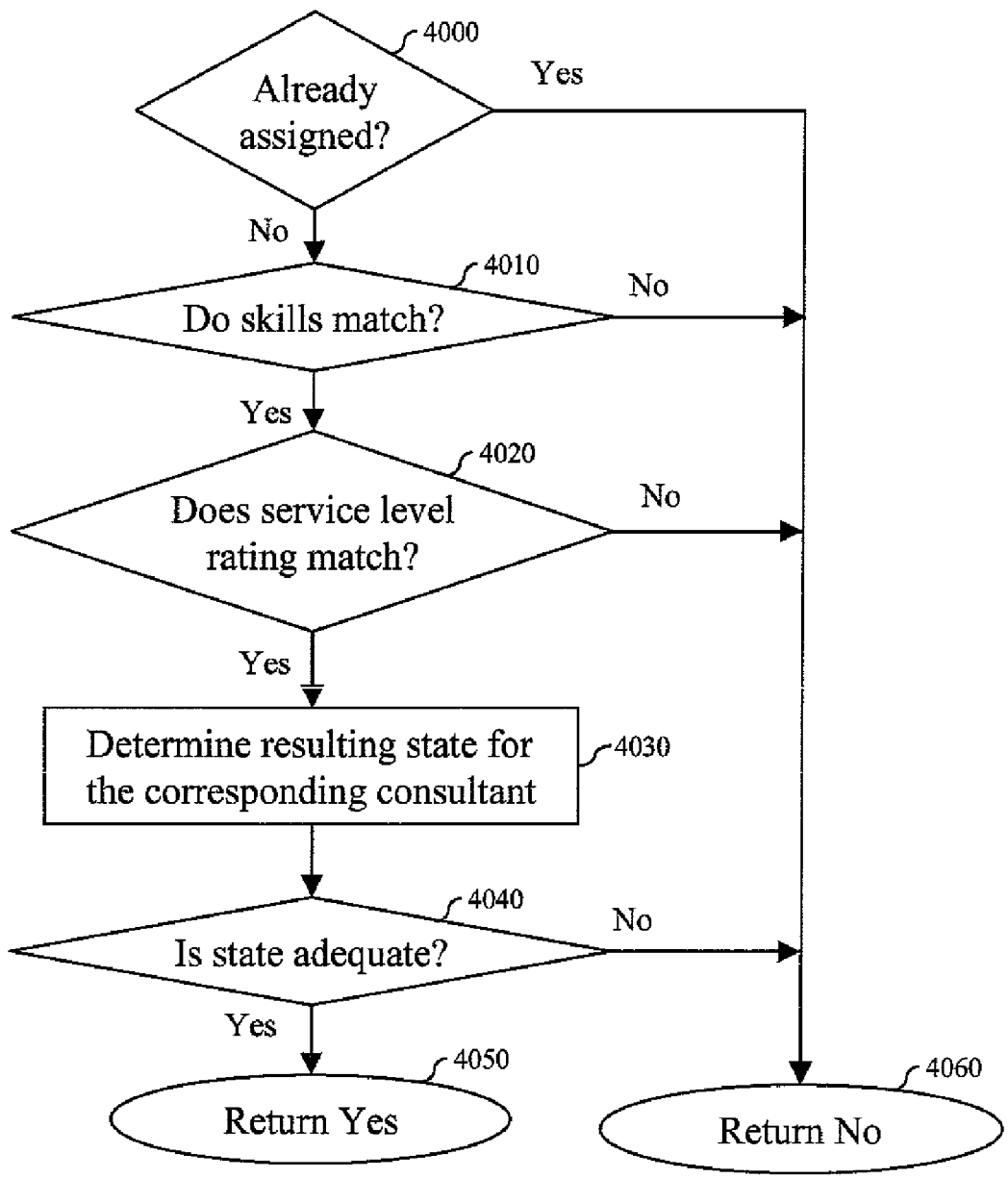
Fig. 4: Consultant Compatibility Handler Flow

Figure 5:
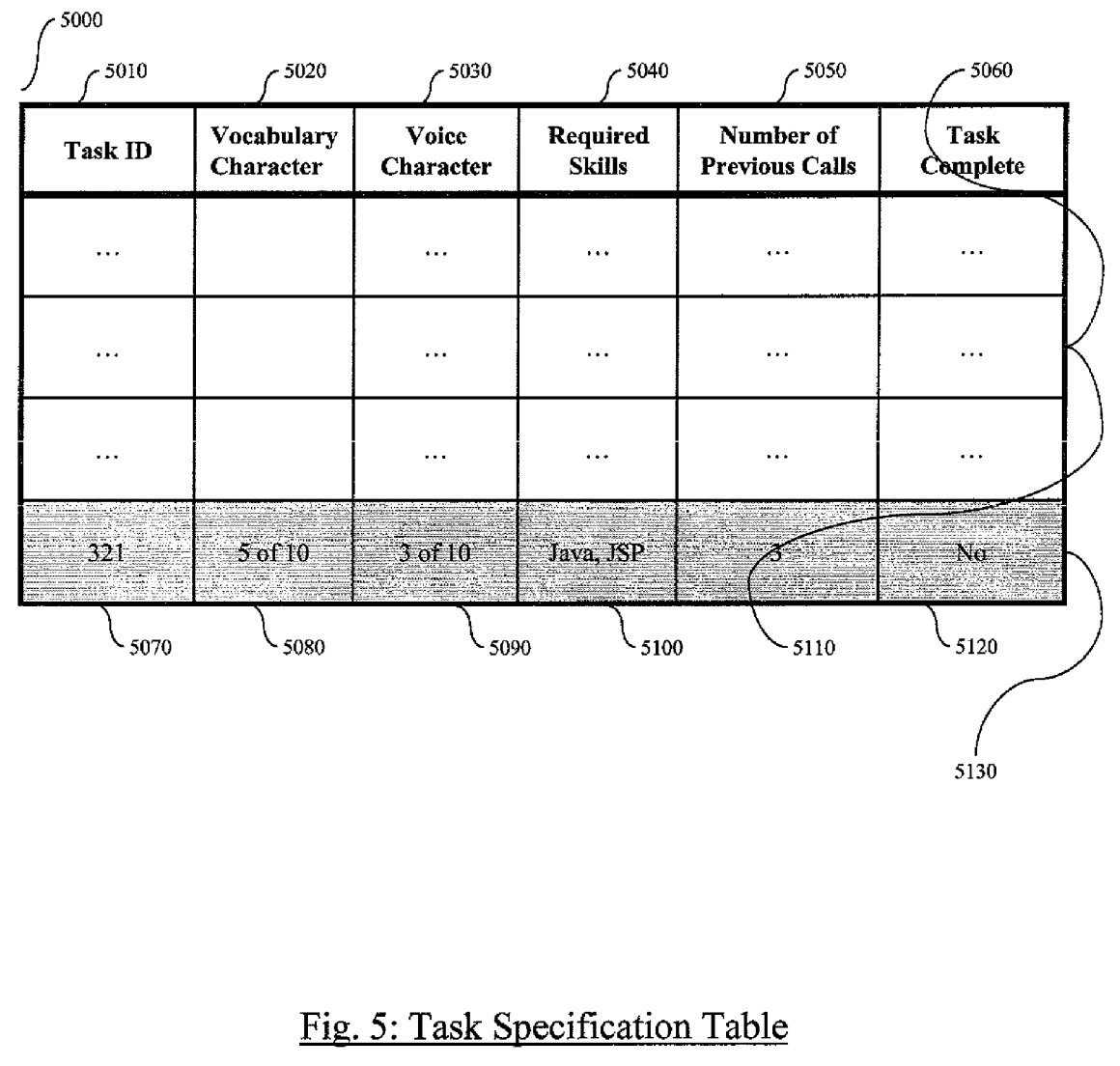

| Task ID | Vocabulary Character | Voice Character | Required Skills | Number of Previous Calls | Task Complete |
|---------|---------------------|-----------------|-----------------|--------------------------|---------------|
| ... | ... | ... | ... | ... | ... |
| ... | ... | ... | ... | ... | ... |
| ... | ... | ... | ... | ... | ... |
| 321 | 5 of 10 | 3 of 10 | Java, JSP | 3 | No |

Fig. 5: Task Specification Table

| Consultant ID ⌐6010 | Blood Pressure ⌐6020 | Pulse (bps) ⌐6030 | Mood ⌐6040 | Level of Fatigue ⌐6050 | Skills ⌐6060 | Task ID (None if Available) ⌐6070 | Service Level Rating ⌐6080 |
|---|---|---|---|---|---|---|---|
| ... | ... | ... | ... |  |  |  | ... |
| ... | ... | ... | ... |  |  |  | ... |
| ... | ... | ... | ... |  |  |  | ... |
| 40960 | 110/80 | 70 | 8 | 2 | Java, JSP, REXX | 321 | Bronze |
| ⌐6090 | ⌐6100 | ⌐6110 | ⌐6120 | ⌐6130 | ⌐6140 | ⌐6150 | ⌐6160 |

Fig. 6: Consultant State Table

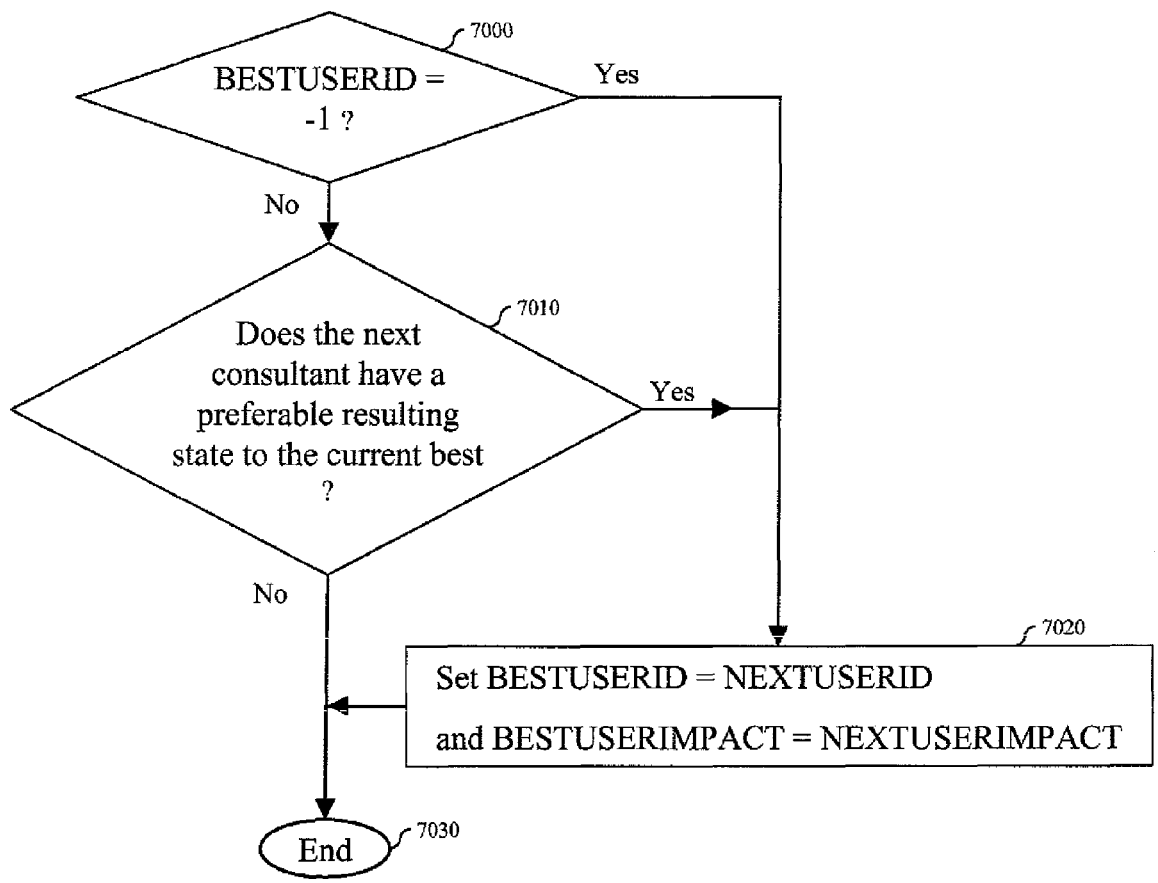
Fig. 7: Impact-Based Comparison Handler Logic

METHOD AND SYSTEM FOR ROUTING A TASK TO AN EMPLOYEE BASED ON PHYSICAL AND EMOTIONAL STATE

BACKGROUND OF THE INVENTION

1. Field of the Invention

The present invention generally relates to assigning a task (i.e., customer issue) to a consultant. More particularly, the present invention relates to assigning the task to a consultant based on estimated emotional and physical impact on the consultant.

2. Description of the Prior Art

Online support applications such as those provided by customer help services have become increasingly important. On encountering an issue, a customer can contact such a service, describe his/her issue, and then receive solutions or suggested remedies. One form of such a service is a FAQ's (Frequently Asked Question) site, where answers to commonly asked questions are posted; here the customer is not connected to a human consultant, the customer must find his/her answer by himself/herself. Standard human staffed help desks or call centers receive customer requests, e.g., via phone calls or chat room sessions. Given such a request, the next available consultant step up and handles the customer's question. Choosing a consultant is based not only on availability, e.g., whether a consultant has an assigned task or not, but also on skill set or level, e.g., only a consultant with knowledge of the LINUX operating system is assigned to issues related to LINUX. However, this choosing of a consultant does not take into account the emotional or physical state of the consultants, e.g., a given available consultant with the necessary skills will still be assigned to a given task even if he is exhausted or emotional drained from a previous customer call. It should be noted that the term consultant here does not imply any particularly high level of service technician. A consultant can include the whole spectrum of employees from advanced agents, able to perform complex analysis, to employees who simply identify an issue and route the request to the appropriate person. A commonly-assigned US patent application (application Ser. No. 11/676,825) "METHOD AND SYSTEM FOR OPTIMIZING UTILIZATION OF A DONOR" (hereinafter HiGrid) provides a method of taking a given consultant's emotional (affective) and physical (somatic) states into account in making assignment decisions. However, HiGrid does not provide any method of making assignment decisions based on an estimated impact on a consultant in case of servicing a given task. Thus, there remains a need for a system and method, which includes an evaluation of the given task and uses an estimated impact on a consultant that serving the given task will have on the consultant, when determining whether or not to assign a given task to that consultant.

SUMMARY OF THE INVENTION

It is therefore an object of the present invention to provide a method, system, computer program product, and computer program storage device for determining an assignment of a task to a consultant.

In one embodiment, there is provided a computer-implemented system for determining an assignment of a task to a consultant, the computer-implemented system comprising:

a computer-implemented consultant state update monitoring handler for monitoring and updating consultant state information associated with a consultant;

a memory storage device for storing the consultant state information and the task; and a computer-implemented consultant assigning handler for determining a best compatible consultant among available consultants for the task.

In another embodiment, there is provided an automatic method for determining an assignment of a task to a consultant, the method comprising:

monitoring consultant state information of at least two consultants;

estimating an impact on consultant state information in case of serving said task; and using said estimated impact and said consultant state information with a policy to assign said task to a consultant.

There are several advantages of such a system and method including, but not limited to:

A higher customer satisfaction, because the consultant/employee is able to deal with the task (i.e., customer issue) with higher empathy, without being emotionally blocked.

A faster issue solving, because the conversation is based more on facts and less based on allegations.

A lower fluctuation rate, because the frustration can be lowered.

A lower employee absence rate, because of less negative impact or even better positive impact on the consultant's well being state.

In another embodiment, when determining assignment of a given task, the present invention evaluates whether a consultant's emotional and physical states are above threshold levels after being adjusted to account for an estimated impact of serving a given task.

BRIEF DESCRIPTION OF THE DRAWINGS

The objects, features and advantages of the present invention will become apparent to one ordinary skill in the art, in view of the following detailed description taken in combination with the attached drawings, in which:

1. FIG. 1 is an illustrative component block diagram showing one embodiment of the present invention.

2. FIG. 2 is a flow diagram illustrating the flow control of an Internal Impact-Based Routing Server (IIBRS) in one embodiment of the present invention.

3. FIG. 3 is a flow diagram illustrating the flow control of a Consultant Assigning Handler in one embodiment of the present invention.

4. FIG. 4 is a flow diagram illustrating the flow control of a Consultant Compatibility Handler in one embodiment of the present invention.

5. FIG. 5 is an example of a Task Specification Table in one embodiment of the present invention.

6. FIG. 6 is an example of a Consultant State Table in one embodiment of the present invention.

7. FIG. 7 is a flow diagram illustrating the flow control of an Impact-Based Comparison Handler in one embodiment of the present invention.

DETAILED DESCRIPTION OF THE PREFERRED EMBODIMENTS

Hereinafter, embodiments of the present invention will be described in detail with reference to the accompanying drawings.

The present invention describes how to assign a given task to a consultant based not only on the consultant's skills and availability, but also on whether (s)he is the one that can bring best benefit in a case of positively estimated impact or withstand/weather a negatively estimated impact on her/his internal state when resolving the given task. The given consultant's internal state is the combination of their emotional and physical states. These two states are defined and used in a commonly-assigned US patent application (application Ser. No. 11/676,825) "METHOD AND SYSTEM FOR OPTIMIZING UTILIZATION OF A DONOR". The physical state is defined as a variable to estimate a human resource's physical condition by measuring, for example, the level of blood sugar, the blood heat, or the like. The emotional state is another variable to detect a human resource's mood to perform a job with lust, joy, or other emotional condition. Basic emotions may include, for example, states of fear, anger, joy, sadness, disgust, seeking/curiosity, social distress, lust, care, play, and the like. Therefore, the whole contents and disclosure of the commonly-assigned US patent application (application Ser. No. 11/676,825) is incorporated by a reference as if fully set forth herein.

FIG. 1 shows a block diagram of an Internal Impact-Based Routing Server (IIBRS) 1000 in one embodiment of the present disclosure. The IIBRS 1000 may comprise any computing system that is able to load and execute programming code may be, but is not limited to, IBM® ThinkPad® or IBM® PowerPC®, running an operating system or a server application suite such as Microsoft® Windows® XP, or a Linux operating system. A system logic 1050 is loaded from a remote source (e.g., from a network file system), local permanent optical (CD-ROM), magnetic storage (such as disk), or storage 1020 into memory 1040 for execution by CPU 1010. The IIBRS 1000 also includes a data network interface 1030, through which the IIBRS 1000 can communicate with other computing systems. Such an interface 1030 may include, but is not limited to, Ethernet over coax cable, wireless IP, and telephone to IP (VoIP), such as that provided by the DVG-1402S Broadband Phone Service VoIP Router from D-Link®. A memory 1040 preferably includes following components:

- a consultant state update monitoring handler 1060;
- a task impact determining handler 1070, described in detail with reference to FIG. 3;
- a consultant assigning handler 1080, described in detail with reference to FIG. 3;
- a consultant compatibility handler 1090, described in detail with reference to FIG. 4;
- an IIBRS database 1100;
- a task update handler 1110, described in detail with reference to FIG. 3; and
- an impact-based comparison handler 1120, described in detail with reference to FIG. 7.

The consultant state update monitoring handler 1060 is responsible for monitoring a consultant state information and updating the IIBRS database 1100 to reflect any changes. The consultant state information includes the consultant's

- affective or emotional state,
- somatic or physical state,
- abilities (e.g., type of skills, level of skill, rating of expected level of performance), and
- availability (e.g., is the consultant now free).

All consultant state information is stored in the IIBRS database 1100, and will be described in detail with references to FIG. 6. The consultant state update monitoring handler 1060, once started, runs continuously on the IIBRS 1000, updating consultant state information as data becomes available. For example, consultants might wear devices that monitor their heart rate variability and blood pressure, and these devices could transmit the information, e.g., heart rate variability and blood pressure, to the consultant state update monitoring handler 1060 (e.g., via wireless network communication). In one embodiment, the heart rate variability of a consultant also defines an emotional state of the consultant. For example, if the heart rate variability of a consultant is greater than a pre-determined frequency range, an emotional state of the consultant can be defined as unstable. An e-book entitled "The Coherent Heart: Heart-Brain Interactions, Psychophysiological Coherence, and the Emergence of System-Wide Order", by Rollin McCraty, et al., HeartMath Research Center, Institute of HeartMath, 2006 (Source: http://www.heartmathstore.com/cgi-bin/category.cgi?item=ecoh&affiliate=1 or http://academic.evergreen.edu/curricular/awareness2006/_The%20Coherent%20Heart82406.pdf) describes that emotions are reflected in human heart rhythm pattern. The e-book by Dr. McCraty further illustrates different heart rhythm patterns during different psychophysiological states (e.g., anger, relaxation, appreciation). Therefore, the whole contents and disclosure of the e-book by Dr. McCraty is incorporated by a reference as if fully set forth herein.

In one embodiment, being "compatible" indicates that all of the following are true for a consultant and a task (i.e., customer issue):

- The consultant is available.
- The consultant has adequate skills to resolve the customer issue.
- The consultant has a sufficiently high performance record.
- The consultant is in a somatic (physical) state that will enable him/her to withstand the estimated impact in case of resolving the customer issue, and
- The consultant is in an affective (emotional) state that will enable him to withstand the estimated impact in case of resolving the customer issue.

The IIBRS database 1100, in one embodiment, provides for creation, deletion and modification of persistent data (i.e., data which always preserves a previous version of itself when the data is modified; data is fully persistent if every version of the data can be accessed and modified) and is used by the handlers 1060-1090 of the IIBRS 1050. In one embodiment, the IIBRS database 1100, is a form of a memory storage device or a disk, which includes two tables, the task specification table 5000 and the consultant state table 6000, each depicted and discussed with reference to FIGS. 5 and 6 respectively.

FIG. 5 depicts the task specifications table 5000 in one embodiment of the current invention. This table maintains requirements and a current state for each task (i.e., customer issue). This table 5000 is an instance of a relational database table in which each row provides data about a particular open task (i.e., open customer issue), and each column provides a particular type specification or state data. In one embodiment of the current invention, the columns of each row provide the following data about a given customer issue:

- Task ID (5010), a unique identifier for the open issue, e.g., 321 (5070);
- Vocabulary Character (5020), indication of the aggressiveness/abusiveness of the issue description vocabulary (i.e., whether a customer used aggressive vocabulary to describe his/her issue), e.g., 5 of 10 (5080);
- Voice Character (5030), indication of the aggressiveness/abusiveness of the customer's voice, (i.e., whether a customer used aggressive voice to describe his/her issue), e.g., 3 of 10 (5090); Voice characterizations include screaming, nervous or relaxed laughing, coughing, screaming, stammering, drumming with his hand, stentorian voice, stumbling and tumbling voice, weeping, and crying;

Required Skills (5040), a list of the skills a consultant must have to work on a customer issue, e.g., Java and JSP (5100); these required skills may be entered manually by a customer (i.e., a task requester); the required skills may also be automatically retrieved from previous tasks which includes similar task topics Number of Previous Calls (5050), the number of previous calls (i.e., the number of contacts from a customer) for an issue, e.g., 3 (5110), meaning that this is the third time the customer has called in trying to resolve task #321;

Task Complete (5060), indication of whether or not a task has been resolved, e.g., no (5120).

One ordinary skill in the art will appreciate that in cases where a customer can be seen, such as in video conferences, additional columns of the task specifications table 5000 could include:

Gestures, e.g., pointing or waving a fist; and blinking rate (e.g., in the first Iraq war, the US war analysts were researching the technique of determining how nervous Saddam Hussein was by counting how rapidly he was blinking).

FIG. 6 depicts the Consultant State Table 6000 in one embodiment of the present invention, maintains significant information about consultants. The information includes the consultants' affective and somatic state as well as the consultants' availability and abilities. Each row of this table holds information about a particular consultant and each column holds a particular type of data. In one embodiment, for each given consultant, the columns indicate:

Consultant ID (6010), a unique ID for the consultant, e.g., 40960 (6090);

Blood Pressure (6020), the consultant's most recent blood pressure measurement, e.g., 110/80 (6100);

Heart Rate Variability (HRV), the consultant's/employee's most recent HRV and his/her HRV in the past time period;

Pulse (6030), the consultant's most recent pulse reading, e.g., 70 (6110). Note that this column could be replaced or supplemented with the R-R Interval, which is the beat-to-beat alteration in an ECG (electrocardiogram). The R-R Interval represents the Heart Rate Variability. There are 26 different types of arithmetic manipulations to calculate the R-R interval (for details, see: "Heart Rate Variability", John D. and Catherine T. MacArthur, Research Network on Socioeconomic Status and Health, http://www.macses.ucsfledu/Research/Allostatic/notebook/heartrate.html);

Mood (6040), indication of the consultant's most recent mood, e.g., 8 (6120). Methods of determining this value include interviewing a consultant, self assessment by the consultant himself/herself, as well as via non-invasive biosensors that communicate their reading to the Consultant State Update Monitoring Handler 1060;

Level of Fatigue (6050), indication of the consultant's most recent level of fatigue, e.g., 2 (6130), a Level of Fatigue of a consultant can be determined by analyzing a HRV pattern of the consultant (for details, see: "Science of the Heart" by McCraty Rollin, et al., HearthMath Research Center, Institute of HeartMath, Publication No. 01-001, http://www.heartmath.org/research/science-of-the-heart/index.html);

Skills (6060), indication of the consultant's skill set, e.g., Java, JSP, REXX (6140); Skills can be manually entered by a consultant or his/her colleagues (e.g., supervisor); Skills of a consultant can be entered automatically based on previous tasks which the consultant worked;

Task ID (6070), the ID of the customer issue to which the consultant is currently assigned, "None" if currently available, e.g., 321 (6150); TaskiD is automatically assigned by a system (e.g., IIBRS 1000);

Service Level Rating (6080), indication of level of service last provided by the consultant, e.g., Bronze (6160); Note that this Service Level Rating can be initialized to a last level of service provided by a customer in his/her previous issue, or an average of previous service level ratings provided by customers in all previous tasks of the consultant; Service Level Rating can be a combined rating from a customer (e.g., friendliness, comprehensibility) and from a system, which proves if a consultant fulfills a service legal agreement (e.g., the consultant solved the customer issue within the agreed 2 minutes).

One ordinary skill in the art will appreciate that implementations which store customer issue information (e.g., vocabulary character, voice character, etc.) and consultant state information (e.g., blood pressure, pulse, mood, etc.) in multiple, possibly related tables, also falls within the scope of the present invention.

FIG. 2 is a flow diagram illustrating the control flow of the IIBRS system logic 1050 in one embodiment of the present invention. At step 2000, the consultant state update monitoring handler 1060 is started to continuously capture and update consultant state information of consultants. These updates are applied to the IIBRS database 1100, particularly to table 5000 described in detail with reference to FIG. 5. In step 2010, the IIBRS waits for inputs other than consultant state updates (e.g., a task request).

When such an input (i.e., input other than consultant state updates) is received, step 2020 checks whether it is a request for a task (i.e., customer issue) to be processed. If so, then the task update handler 1110 is invoked in step 2030. The task update handler 1110 parses the specified task and then either creates a new entry in the task specification table 5000 if no entry for the given task exists yet, or updates the existing relevant entry. As is described in further detail with reference to FIG. 5, information describing the given task includes:

A characterization of the aggressiveness and/or abusiveness of a requestor's (i.e., customer's) vocabulary;

A characterization of the aggressiveness and/or abusiveness of the customer's voice; and Skills required to resolve the given task.

Once the task information (i.e., information describing a given task) is obtained, the task updates handler 1110 either creates a new entry in the task specification table 5000, using a newly created task ID, or updates a related existing entry. This update includes incrementing the previous calls 5050 count. The information related to each task entry is described in detail with reference to FIG. 5.

At step 2040, the consultant assigning handler 1080 is invoked to process the given task. The consultant assigning handler 1080 is described in detail with reference to FIGS. 3, 4, and 7. Following the execution of consultant assigning handler 1080, control continues at step 2010. If step 2020 determines that the input is not a task processing request (i.e., request for a task), then a miscellaneous handler is invoked in step 2050. Once finished, control continues at step 2010. In one embodiment, the miscellaneous handler may perform one of: ping (i.e., testing whether the IIBRS 1000 is reachable across an IP network), or ver (i.e., notifying the version of an operating system which IIBRS 1000 executes)

FIG. 3 is a flow diagram illustrating the control flow of the consultant assigning handler 1080 in one embodiment of the present invention. The consultant assigning handler 1080 determines which consultant to assign to a given task, taking into account not only a given consultant's availability and skill set, but also the positive or negative effect that the servicing of the given task (i.e., customer issue) will have on the consultant's somatic (physical) and affective (emotional) states. As depicted in FIG. 3, at step 3000, the consultant assigning handler 1080 first sets a BESTUSERID variable equal to a pre-defined value, e.g., −1, indicating that there is yet not yet any consultant who has been identified as a best match. Also in step 3000, the BESTUSERIMPAACT variable is set to none, indicating that its value has not been set to one representing the actual impact on a given consultant. Next, in step 3010, the consultant assigning handler 1080 obtains a list of the IDs of all possible consultants, e.g., from the consultant state table 6000 (i.e., a list of all consultants is obtained in step 3010). In step 3020, the consultant assigning handler 1080 attempts to take a next available ID from its list of ID's, and assign this value to the consultant assigning handler's 1080 NEXTUSERID variable (i.e., assign NEXTUSERID to the next successive member of the list, until the end of the list is reached (i.e., when there is no Ether member)). If the list is initially empty, then step 3020 will never succeed. If successful, then step 3030 calls the task impact determining handler 1070, passing it NEXTUSERID and the task ID. When returned, the estimated impact calculated by the task impact determining handler 1070 is assigned to NEXTUSERIMPACT. This metric may indicate both positive and negative impacts.

The factors the task impact determining handler 1070 can use to express estimate changes of the consultant's internal state (i.e., combination of physical state and emotional state) can include, but are not limited to:

Increase or decrease of the physiological coherence (i.e., a natural human state; Physiological coherence is associated with a sine wave-like pattern in the heart rhythms, a shift in autonomic balance towards increased parasympathetic activity, increased heart-brain synchronization between diverse physiological systems) based on the heart rate variability;
  Increased or decreased blood pressure;
  Increased or decreased pulse;
  Deterioration of the consultant's mood; and
  Increased level of fatigue.

In computing the estimated impact (e.g. increased or decreased blood pressure, increased or decreased pulse, deterioration of the consultant's mood, etc.) on the consultant's internal state, the task impact determining handler 1070 can take into account the given task's vocabulary character (e.g., whether a customer used aggressive vocabulary when describing his/her issue) and voice character (e.g., whether a customer's voice was aggressive when describing his/her issue), and the number of previous calls (e.g., how many times a customer contacted before). In addition, the task impact determining handler 1070 can also use one or more of the following in determining an estimated impact on the consultant's internal state in case of serving the given task:

gender issues (e.g., a given employee/consultant being more highly intimidated by a particular gender);
  time of day, or date (e.g., a given employee having more resilience earlier in day or during summer);
  task topic (e.g., a given employee being more resilient when handling issues concerning web services than when handling hardware issues; a given employee being more resilient when handling simple matter than when handling complicated matter);
  how long the current issue has been open; and the given employee's recent service history (e.g., a given employee's ability to handle an issue concerning a particular application is reduced because they have just finished handling 10 similar issues; another employee who has handled other sorts of issues will be more fresh).

In one embodiment, the additional information (e.g., the gender of a requestor (i.e., customer), the time of day, the task topic, an indication of when the given task was first opened, and the given employ's recent service history) may be included in the task specification table 5000. Further, in another embodiment, a log of a consultant's assignments may be maintained in the IIBRS database 1100, e.g., in a separate table.

In one embodiment, a history of estimated impacts for each employee is maintained in IIBRS Database 1100. Based on the history, it is determined whether the estimated impacts for a given employee are getting better or worse and whether the estimated impacts for a set of given employees (e.g., those under a particular manager or those working on a particular technology) are getting better or worse.

In one embodiment of the present invention, a given consultant's internal state is indicated by several elements in the Consultant State Table 6000, including the mood 6040 (emotional) and the level of fatigue 6050 (physical). Both of these elements (e.g., mood 6040, level of fatigue 6050) are indicated by simple integers, from 0 to 10, where 0 represents the worst and 10 represents the best. An estimated impact returned by the task impact determining handler 1070 is the estimated amount by which these two values may change for a given consultant, if (s)he serves a given task. This impact then can be expressed as a pair of numbers, the change in mood and the change in level-of-fatigue. To determine this impact for a given employee, the task impact determining handler 1070 may traverse a list including, but not limited to all of the task information factors mentioned above (e.g., vocabulary character, gender issues, time of day, task topic, etc.) and adjust a value of the mood and a value of the level of fatigue for each factor.

Step 3040 then invokes the consultant compatibility handler 1090—passing it NEXTUSERID and NEXTUSERIMPACT to determine if the consultant corresponding to NEXTUSERID is compatible with the task whose impact is held by NEXTUSERIMPACT (i.e., the task ID). If the consultant compatibility handler 1090 returns that the consultant is compatible, then, in step 3050, the impact-based comparison handler 1120 is invoked—being passed the BESTUSERID, BESTUSERIMPACT, NEXTUSERID, and NEXTUSERIMPACT—to determine which of the corresponding consultants is the best choice for the given task. Note that this might be the consultant that would derive the greatest benefit, or the one that is best able to handle a related negative impact. As is described in detail with reference to FIG. 7, both the BESTUSERID and BESTUSERIMPACT variables are updated by the impact-based comparison handler 1120 to reflect an impact-based comparison handler's choice. Control then continues at step 3020. If step 3040 determines that the consultant corresponding to NEXTUSERID is not compatible with the given task, then control also continues at step 3020. Once step 3020 determines that there not any further IDs in its list (i.e., that all the consultants have been checked for compatibility or that there weren't any consultants in the list from the start, i.e., step 3010), control continues at step 3060, which checks whether BESTUSERID is still equal to a pre-defined value, e.g., −1. If BESTUSERID is not equal to −1, then in step 3070 the consultant whose ID is BESTUSERID is assigned to the task, with a consultant's entry in the consultant state table 6000 updated to reflect this assignment, specifically the task's ID being entered in the consultant's task ID column 6070. Otherwise, in step 3080 the consultant assigning handler 1080 informs a requesting customer that there are not currently any available (compatible) consultants.

FIG. 4 is a flow diagram illustrating the control flow of the consultant compatibility handler 1090 in one embodiment of the present invention. The consultant compatibility handler 1090 is responsible for determining whether a consultant will be able to resolve a given task. This compatibility check (i.e., determining whether a consultant will be able to resolve a given task) includes not only the consultant's being available and having the necessary skills, but also being able to withstand the negative impact coming from servicing the given task. At step 4000, the consultant compatibility handler 1090 first checks whether the consultant is available, e.g., by checking whether the task ID column 6070 of the consultant's entry in the consultant state table 6000 already contains an ID of another open task. If the consultant is currently assigned to a task, the consultant compatibility handler 1090 returns no in step 4060, indicating that the consultant is incompatible with the given task. Otherwise, in step 4010, the consultant's skill set is checked to verify that the consultant's skills are sufficient for the given task. If the consultant does not have a sufficient skill set, the consultant compatibility handler 1090 returns no in step 4060, indicating that the consultant is incompatible with the given task. Otherwise, the consultant compatibility handler 1090 checks whether the given consultant's service level rating is sufficient in step 4020 to verify that the quality of the given consultant's work is high enough. If the consultant does not have a sufficient service rating, the consultant compatibility handler 1090 returns no in step 4060, indicating that the consultant is incompatible with the given task. Otherwise, in step 4030, the consultant compatibility handler 1090 uses estimated impact that was passed—in NEXTUSERIMPACT—by the consultant assigning handler 1080 to determine the resulting state for the given consultant—corresponding to NEXTUSERID—if the given consultant is able to serve the given task.

This computation could include determining new resulting values when the values from the consultant state table 6000 are adjusted with the value from the impact (e.g., the resulting pulse is 120, given that the starting pulse was 90 and the impact estimated an increase of 30). Step 4040 checks whether this resulting state is an acceptable one, this check being based on values and thresholds stated in an organization's operating policy. For example, such a policy could indicate that no consultant's pulse should exceed 300 and a level of fatigue of a consultant should not rise above 8, i.e., near-complete exhaustion. If the check performed at step 4040 succeeds, then the consultant compatibility handler 1090 returns a "yes" indication in step 4050. If the check performed at step 4040 fails, the consultant compatibility handler 1090 returns a "no" indication in step 4060.

FIG. 7 is a flow diagram illustrating a control flow of the impact-based comparison handler 1120 in one embodiment of the present invention. This impact-based comparison handler 1120 determines which of the two consultants, whose ID are BESTUSERID (i.e., a most compatible consultant so far) and NEXTUSERID (i.e., a consultant who just passed compatibility check by the consultant compatibility handler), is best suited for the task, and who would have impacts of BESTUSERIMPACT and NEXTUSERIMPACT, respectively, if they were to service the given requests. This determination can include identifying which of the two consultants will derive the greatest benefit, in case the effect is positive, or which can best withstand the ill effects in cases where the impact is negative. As shown, in step 7000, the handler 1120 first checks whether BESTUSERID equals −1, in which case the handler 1120 sets BESTUSERID equal to NEXTUSERID in step 7020 for future use by the consult assigning handler 1080. If not, then step 7010 determines which of the consultants' resulting states (set and saved in the consultant compatibility handler 1090) is preferable. Methods of making this decision include the use of a policy, which provides a prioritization to the internal state factors. For example, a given policy might state that level of fatigue 6050 should be checked first, followed by mood 6040, followed by pulse 5030 followed by blood pressure. If the check in step 7010 determines that NEXTUSERID'S resulting state is preferable to that of BESTUSERID, then the handler 1120 in step 7020 sets BESTUSERID equal to NEXTUSERID and BESTUSERIMPACT equal to NEXTUSERIMPACT for future use by the consult assigning handler 1080 and ends in step 7030. Otherwise, the handler 1120 makes no changes and ends in step 7030.

One of ordinary skill in the art can appreciate that if the internal state (e.g., mood and level of fatigue) of a task requestor (i.e., a customer) was known, it could also be used by the Task Impact Determining Handler 1070 as an additional feature for estimating impact for a given consultant in case of serving a requested task from the given task requestor. For example, if it were known that a given requester were extremely mad (e.g., as indicated by his/her mood value) and yet very well rested (e.g., as indicated by their level-of-fatigue), then both the estimated impact on the serving consultant's mood and level-of-fatigue would be quite high. A simple method of obtaining the requestor's internal state would be if the requester worked for a company which monitored this information—e.g., the requestor works as a help-desk employees in a same firm with a serving consultant. In this case, the requestor's internal state could simply be retrieved from the Consultant State Table 6000, or wherever the company kept this data. Alternatively, the requestor's state could be estimated using the same factors (e.g., task topic, how long the task has been opened, vocabulary characteristic, voice characteristic) used by the Task Impact Determining Handler 1070.

In one embodiment, a logical entity is provided to check an accuracy of the estimated impact after each task is completed. Further, the logical entity provides a feedback based on the accuracy to increase future estimate accuracy.

Following is a usage scenario that reflects how the present invention can be utilized.

1. Using a standard web browser (e.g., an Internet Explorer®, Firefox®, etc.) on her network-connected laptop, Jane Doe brings up the send-in-question webpage (i.e., a webpage where a user can enter his/her issue) of a helpdesk website.
2. Jane then enters a description of the issue that she has been having and sends an email containing a photo using Seton email application.
3. A Helpdesk Server receives her request and analyzes it to estimate its physical and emotional impact on whoever handles it. As luck would have it, the answer to Jane's request is simple; she must simultaneously press the CONTROL, ALT, Home and F1 key's of her laptop. Since this only requires a helpdesk consultant to explain this procedure, the physical impact of the request is estimated at only 3 out of a possible 10, 10 being the highest. Even though the estimated physical impact is low, the estimated emotional impact is given an 8. This is both because of the presence of particular harsh keywords in the request note, and because of a review of Jane Doe's previous calls (in a Helpdesk database) in which she complained that she has been highly dissatisfied with the Seton product. She used abusive languages to helpdesk consultants who handled her earlier calls.

4. The Helpdesk server reviews the list of available consultants and finds there are four: Bob, Carol, Ted and Alice, each of whom has a requisite skill to handle the call.

5. The Helpdesk Server then compares each potential consultant's estimated impact on a physical and emotional state to determine who can best handle a physical=3, emotional=8 call. It turns out that Alice is a choice, because Bob cannot handle calls with physical strain of 3, and Carol and Ted are only able to withstand calls with an emotional load of 7 or less.

6. Thus, Jane's call is assigned to Alice. This assignment includes storing of an association between Jane and Alice, Jane's request, the estimated physical and emotional impacts, as well as Alice physical and emotional states when she take the call.

7. Once this call is completed, an additional information is stored in the Helpdesk server's database indicating Alice's physical and emotional states at the end of the call as well as a summary of the results (e.g., whether the issue was solved along with any other relevant facts, such as whether Jane was again abusive). Further, Alice's physical and emotional states are updated so that correct assigning decisions can be accurately made in the future.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented system for determining an assignment of
   a task to a consultant, the computer-implemented system comprising:
     a memory storage device storing task information associated with said task and consultant state information associated with one or more available consultants; and
     a processor connected to the memory storage device, wherein the processor is configured to:
       estimate, prior to assigning the task, a physical impact on each of said one or more available consultants from resolving the task and estimate an emotional impact on the each of said one or more available consultants from resolving the task, the estimated physical and emotional impact from resolving the task including a plurality of factors, the factors including two or more of: a change from a recent blood pressure measurement of the each of said one or more available consultants, a change from a recent heart rate variability measurement of the each of said one or more available consultants, a change from a recent pulse reading of the each of said one or more available consultants, a change from an indication of a recent mood of the each of said one or more available consultants, and a change from an indication of a recent level of fatigue of the each of said one or more available consultants;
       estimate, prior to assigning the task, a change from a previous service level rating of the each of said one or more available consultants;
       monitor and update, prior to assigning the task, the consultant state information associated with said one or more available consultants, the monitored and updated consultant state information including the estimated emotional and physical impact on the each of said one or more available consultants;

run a compatibility check on the one or more available consultants, the compatibility check including: verifying whether the previous service level rating of the one or more available consultants is high enough to take the task, determining whether the estimated emotional and physical impacts of the one or more available consultants comply with at least one policy associated with the one or more available consultants, comparing the estimated emotional and physical impacts against a threshold associated with the at least one policy, the at least one policy prioritizing an order of consideration of the factors in the estimated emotional and physical impacts;

select compatible consultants among the one or more available consultants based on the compatibility check;

compare, prior to assigning the task, results of the compatibility check of the selected compatible consultants against each other; and determine, prior to assigning the task, a best compatible consultant among said selected compatible consultants for said task, based on the comparison of the results of the compatibility check and the prioritized order of consideration of the factors in the policy.

2. The system according to claim 1, wherein said memory storage device comprises a task specification table for maintaining said task information and a consultant state table for maintaining said consultant state information.

3. The system according to claim 2, wherein said task specification table comprises one or more of: an indication of aggressiveness of a task description vocabulary, an indication of aggressiveness of a customer's voice, required skills of a consultant to work on said task, number of previous calls from a customer, and a completeness of said task.

4. The system according to claim 2, wherein said consultant state table comprises one or more of: a most recent blood pressure measurement of said consultant, a heart rate variability of said consultant, a most recent pulse reading of said consultant, an indication of a most recent mood of said consultant, an indication of a most recent level of fatigue of said consultant, a list of skill sets of said consultant, and a previous service level rating of said consultant provided by a customer.

5. The system according to claim 2, wherein the processor is further configured to:
monitor and update said task specification table.

6. The system according to claim 1, wherein the processor is further configured to determine whether the each of the one or more consultants can resolve said task based on availability of the each of said one or more consultants, a skill set of the each of said one or more consultants, an ability of the each of the one or more consultants to withstand the estimated physical and emotional impact in case of serving said task, and an organization's operating policy.

7. The system according to claim 1, wherein the processor is configured to estimate the physical and emotional impact on the one or more consultants based one or more of: whether a customer used an aggressive vocabulary to describe said task, whether said customer used an aggressive voice to describe said task, how many times said customer called before, whether said consultant has been intimidated by one particular gender, when said consultant has been resilient, which topic said consultant has resilience for, how long said task has been opened, and work history of the consultant.

8. The system according to claim 7, wherein the processor is further configured to update the consultant state information based on said estimated physical and emotional impact.

9. The system according to claim 7, wherein the processor is further configured to:
compare the best compatible consultant and a new consultant who passes the compatibility check to determine a more compatible consultant.

10. An automatic method for determining an assignment of a task to a consultant, the method comprising:
monitoring, by a computing system including a memory device and a processor connected to the memory device, consultant state information of at least two available consultants;

prior to assigning the task, estimating, by the computing system, an impact on consultant state information of each of the at least two available consultants from resolving the task, said estimated impact on said consultant state information from resolving the task including a plurality of factors, the factors including two or more of: a change from a recent blood pressure measurement of the each of the at least two available consultants, a change from a recent heart rate variability measurement of the each of the at least two available consultants, a change from a recent pulse reading of the each of the at least two available consultants, a change from an indication of recent mood the each of the at least two available consultants, and a change from an indication of a recent level of fatigue of the each of the at least two available consultants;

prior to assigning the task, estimating, by the computing system, a change from a previous service level rating of the each of the at least two available consultants;

running a compatibility check on the at least two available consultants, the compatibility check including: verifying whether the previous service level rating of the at least two consultants is high enough to take the task, determining whether the estimated emotional and physical impacts of the at least two available consultants comply with at least one policy associated with the at least two available consultants, comparing the estimated emotional and physical impacts against a threshold associated with the at least one policy, the at least one policy prioritizing an order of consideration of the factors in the estimated emotional and physical impacts;

selecting compatible consultants among the at least two available consultants based on the compatibility check;

prior to assigning the task, comparing, by the computing system, results of the compatibility check of the selected compatible consultants; and determining, prior to assigning the task, a best compatible consultant among the selected compatible consultants for the task, based on the comparison of the results of the compatibility check and the prioritized order of consideration of the factors in the policy.

11. The method according to claim 10, wherein said task is a service request.

12. The method according to claim 11, wherein the step of estimating impact includes one or more of: analyzing a customer's vocabulary character and the customer's voice character.

13. The method according to claim 10, further comprising:
determining physical state and emotional state of a task requester.

14. The method according to claim 10, wherein the step of estimating the impact utilizes said determined physical state and said emotional state of said task requestor.

15. The method according to claim 10, wherein the step of estimating an impact is performed separately for each consultant, taking into account parameters specific to the each consultant, said parameters comprising: whether said each consultant has been intimidated by one particular gender, when said each consultant has been resilient, which topic said each consultant has resilience for, and work history of the each consultant.

16. The method according to claim 11, wherein the step of estimating includes review of how long said task has been opened and how many interactions between the each of the at least two available consultants and a customer regarding said task have taken place.

17. A computer program product comprising computer usable medium having computer readable program code means stored therein for causing functions to determine an assignment of a task to a consultant, the computer program code means in said computer program product comprising computer readable program code means for causing a computer to effect method steps, the method steps comprising:

monitoring, by a computing system including a memory device and a processor connected to the memory device, consultant state information of at least two available consultants;

prior to assigning the task, estimating, by the computing system, an impact on consultant state information of each of the at least two available consultants from resolving the task, said estimated impact on said consultant state information from resolving the task including a plurality of factors, the factors including two or more of: a change from a recent blood pressure measurement of the each of the at least two available consultants, a change from a recent heart rate variability measurement of the each of the at least two available consultants, a change from a recent pulse reading of the each of the at least two available consultants, a change from an indication of recent mood the each of the at least two available consultants, and a change from an indication of a recent level of fatigue of the each of the at least two available consultants;

prior to assigning the task, estimating, by the computing system, a change from a previous service level rating of the each of the at least two available consultants;

running a compatibility check on the at least two available consultants, the compatibility check including: verifying whether the previous service level rating of the at least two consultants is high enough to take the task, determining whether the estimated emotional and physical impacts of the at least two available consultants comply with at least one policy associated with the at least two available consultants, comparing the estimated emotional and physical impacts against a threshold associated with the at least one policy, the at least one policy prioritizing an order of consideration of the factors in the estimated emotional and physical impacts;

selecting compatible consultants among the at least two available consultants based on the compatibility check;

prior to assigning the task, comparing, by the computing system, results of the compatibility check of the selected compatible consultants at least two available consultants; and determining prior to assigning the task, a best compatible consultant among the selected compatible consultants for the task, based on the comparison of the results of the compatibility check and the prioritized order of consideration of the factors in the policy.

18. A computer program storage device, readably by machine, tangibly embodying a program of instructions executable by a machine to perform method steps for determining an assignment of a task to a consultant, said method steps comprising:

monitoring, by a computing system including a memory device and a processor connected to the memory device, consultant state information of at least two available consultants;

prior to assigning the task, estimating, by the computing system, an impact on consultant state information of each of the at least two available consultants from resolving the task, said estimated impact on said consultant state information from resolving the task including a plurality of factors, the factors including two or more of: a change from a recent blood pressure measurement of the each of the at least two available consultants, a change from a recent heart rate variability measurement of the each of the at least two available consultants, a change from a recent pulse reading of the each of the at least two available consultants, a change from an indication of recent mood the each of the at least two available consultants, and a change from an indication of a recent level of fatigue of the each of the at least two available consultants;

prior to assigning the task, estimating, a change from a previous service level rating of the each of the at least two available consultants;

running a compatibility check on the at least two available consultants, the compatibility check including: verifying whether the previous service level rating of the at least two consultants is high enough to take the task, determining whether the estimated emotional and physical impacts of the at least two available consultants comply with at least one policy associated with the at least two available consultants, comparing the estimated emotional and physical impacts against a threshold associated with the at least one policy, the at least one policy prioritizing an order of consideration of the factors in the estimated emotional and physical impacts;

selecting compatible consultants among the at least two available consultants based on the run compatibility check;

prior to assigning the task, comparing, by the computing system, results of the compatibility check of the selected compatible consultants; and determining, prior to assigning the task, a best compatible consultant among the selected compatible consultants for the task, based on the comparison of the results of the compatibility check and the prioritized order of consideration of the factors in the policy.

* * * * *